United States Patent
Phillips et al.

(10) Patent No.: US 6,459,894 B1
(45) Date of Patent: Oct. 1, 2002

(54) METHOD AND APPARATUS FOR ASSISTING A USER TO FIND A COMMUNICATION RESOURCE OF SUFFICIENT CAPACITY

(75) Inventors: W. Garland Phillips, Arlington, TX (US); Larry David Jordan, Granbury, TX (US); Slim Souissi, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/510,599

(22) Filed: Feb. 22, 2000

(51) Int. Cl.$^7$ ................................. H04Q 7/20
(52) U.S. Cl. ................. 455/424; 455/425; 455/456; 455/457; 455/67.1
(58) Field of Search ................ 455/424, 425, 455/423, 420, 421, 418, 456, 457, 458, 67.1

(56) References Cited

U.S. PATENT DOCUMENTS

| | | | |
|---|---|---|---|
| 5,208,756 A | * | 5/1993 | Song ........................... 364/449 |
| 5,241,686 A | * | 8/1993 | Charbonnier ............... 455/33.2 |
| 5,428,821 A | * | 6/1995 | Krisna et al. ............... 455/54.1 |
| 5,483,676 A | * | 1/1996 | Mahany et al. ............. 455/67.4 |
| 5,491,837 A | * | 2/1996 | Haartsen ....................... 455/62 |
| 5,504,937 A | * | 4/1996 | Kangas ....................... 455/33.3 |
| 5,615,255 A | * | 3/1997 | Lemieux ...................... 379/230 |
| 5,732,358 A | * | 3/1998 | Sawaya et al. ............... 455/525 |
| 5,828,962 A | * | 10/1998 | Ho-A-Chuck ................ 455/446 |
| 5,901,358 A | * | 5/1999 | Petty et al. .................. 455/456 |
| 5,974,330 A | | 10/1999 | Negishi ....................... 455/457 |
| 6,285,875 B1 | * | 9/2001 | Alajoki et al. ............... 455/423 |
| 6,308,071 B1 | * | 10/2001 | Kalav .......................... 455/446 |

* cited by examiner

Primary Examiner—Edward F. Urban
Assistant Examiner—Marceau Milord
(74) Attorney, Agent, or Firm—Robert L. Breeden; Hisashi D. Watanabe

(57) ABSTRACT

A wireless communication system measures (602) a traffic load of ones of a plurality of fixed communication stations (102, 202) and transmits (606) from at least one of the stations information describing a location of the at least one of the stations and locations of nearby other stations, along with traffic loads corresponding to the stations. A portable communication unit (104) within communication range of the station conveys (608) the information, thereby assisting the user of the portable communication unit to find a fixed communication station having sufficient capacity available for handling a desired communication.

18 Claims, 3 Drawing Sheets

METHOD AND APPARATUS FOR ASSISTING A USER TO FIND A COMMUNICATION RESOURCE OF SUFFICIENT CAPACITY

FIELD OF THE INVENTION

This invention relates in general to wireless communication systems, and more specifically to a method and apparatus for assisting a user to find a communication resource of sufficient capacity.

BACKGROUND OF THE INVENTION

Wireless communication systems having very small coverage areas are proposed for providing high-speed data access for people in buildings such as office buildings, train stations, shopping malls, and airport terminals. Such installations have to deal with sporadic traffic peaks that can occur at specific locations due to various events occurring in the building, e.g., arrivals and departures of transportation, special shows, meal times, etc. The traffic peaks can temporarily consume all or most of the capacity available at a particularly busy location, blocking additional communications at the location, while capacity goes unused at a nearby less busy location.

Thus, what is needed is a method and apparatus that can determine the location of a nearby communication resource having available capacity and that can identify the location to the user, preferably along with an indication of the current traffic load at the location. The indication of the current traffic load will allow the user to make an informed decision about whether a trip to the nearby location will likely succeed in enabling a desired communication.

SUMMARY OF THE INVENTION

An aspect of the present invention is a method for assisting a user to find an available communication resource. The method comprises the steps of measuring a traffic load of ones of a plurality of fixed communication stations; and transmitting from at least one of the plurality of fixed communication stations information describing a location of the at least one of the plurality of fixed communication stations and locations of nearby others of the plurality of fixed communication stations, along with traffic loads corresponding to the stations. The method further comprises the step of conveying the information from a portable communication unit within communication range of the at least one of the plurality of fixed communication stations, thereby assisting the user of the portable communication unit to find a fixed communication station having sufficient capacity available for handling a desired communication.

Another aspect of the present invention is a wireless communication system for assisting a user to find an available communication resource. The wireless communication system comprises a plurality of fixed communication stations, each station comprising a transceiver and a processor coupled to the transceiver for controlling the transceiver. The processor is programmed to measure a traffic load of the station; and to control the transceiver to transmit information describing a location of the station and locations of nearby others of the plurality of fixed communication stations, along with traffic loads corresponding to the stations. The wireless communication system further comprises a portable communication unit for conveying the information to the user, thereby assisting the user to find a fixed communication station having sufficient capacity available for handling a desired communication.

Another aspect of the present invention is a fixed communication station, comprising a transceiver, and a processor coupled to the transceiver for controlling the transceiver. The processor is programmed to measure a traffic load of the station, and to control the transceiver to transmit information describing a location of the station and locations of nearby others of the plurality of fixed communication stations, along with traffic loads corresponding to the stations.

DETAILED DESCRIPTION OF THE DRAWINGS

Figure 1:
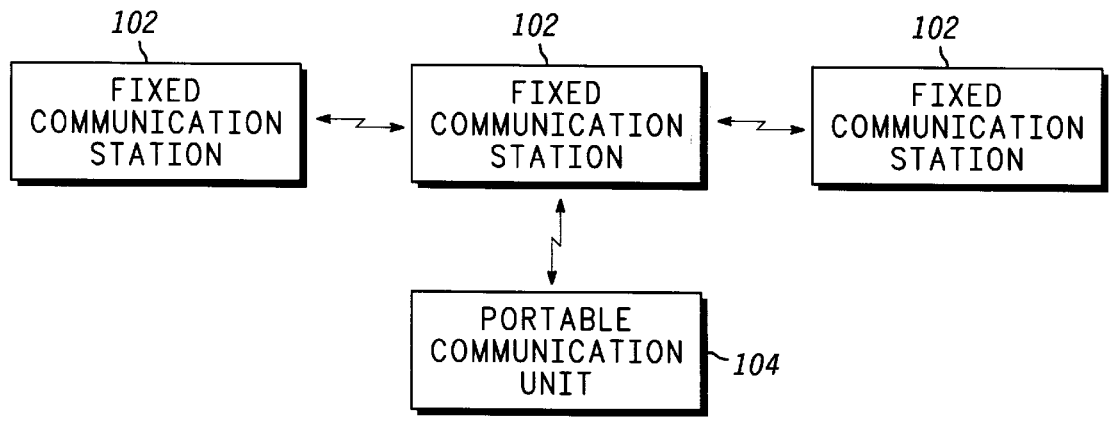
FIG. 1 is an electrical block diagram of a first embodiment of a wireless communication system in accordance with the present invention.

Referring to FIG. 1, an electrical block diagram of a first embodiment 100 of a wireless communication system in accordance with the present invention comprises a plurality of fixed communication stations 102 and a portable communication unit 104. In the first embodiment 100, the fixed communication stations 102 and the portable communication unit 104 preferably form an ad-hoc network through a conventional wireless ad-hoc networking technology, such as Bluetooth. It will be appreciated that, alternatively, the fixed communication stations 102 can communicate with one another through conventional wired communication links, and can communicate with the portable communication unit through conventional wireless techniques.

Figure 2:
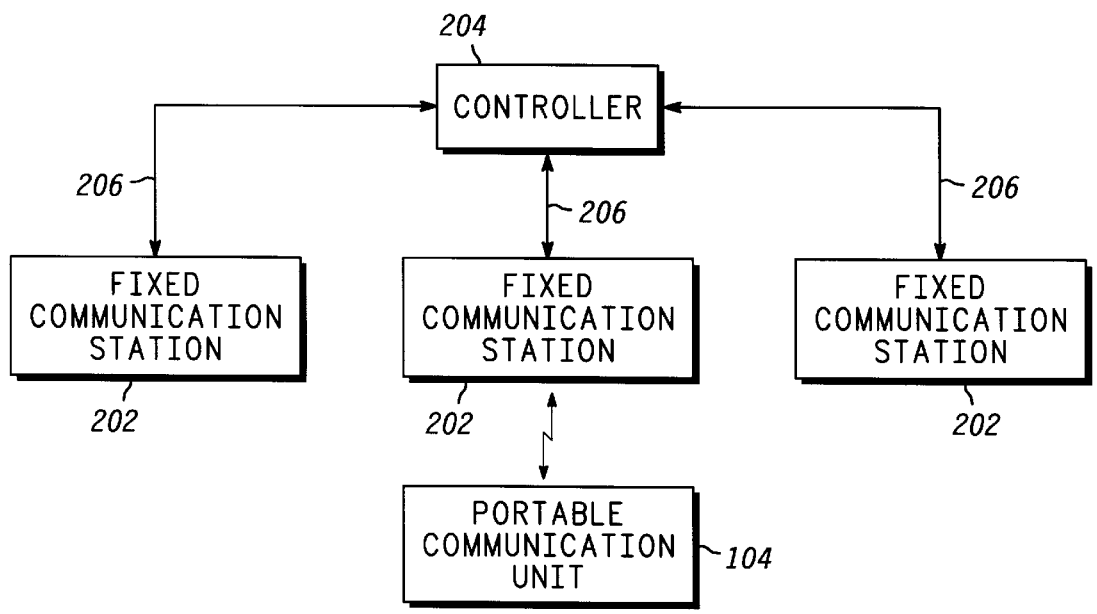
FIG. 2 is an electrical block diagram of a second embodiment of a wireless communication system in accordance with the present invention.

Referring to FIG. 2, an electrical block diagram of a second embodiment 200 of a wireless communication system in accordance with the present invention comprises a plurality of fixed communication stations 202 and the portable communication unit 104. In addition, the second embodiment 200 includes a controller 204 coupled to the fixed communication stations 202 through conventional communication links 206. In this embodiment, the portable communication unit 104 preferably communicates with the fixed communication stations 202 through conventional wireless techniques.

Figure 3:
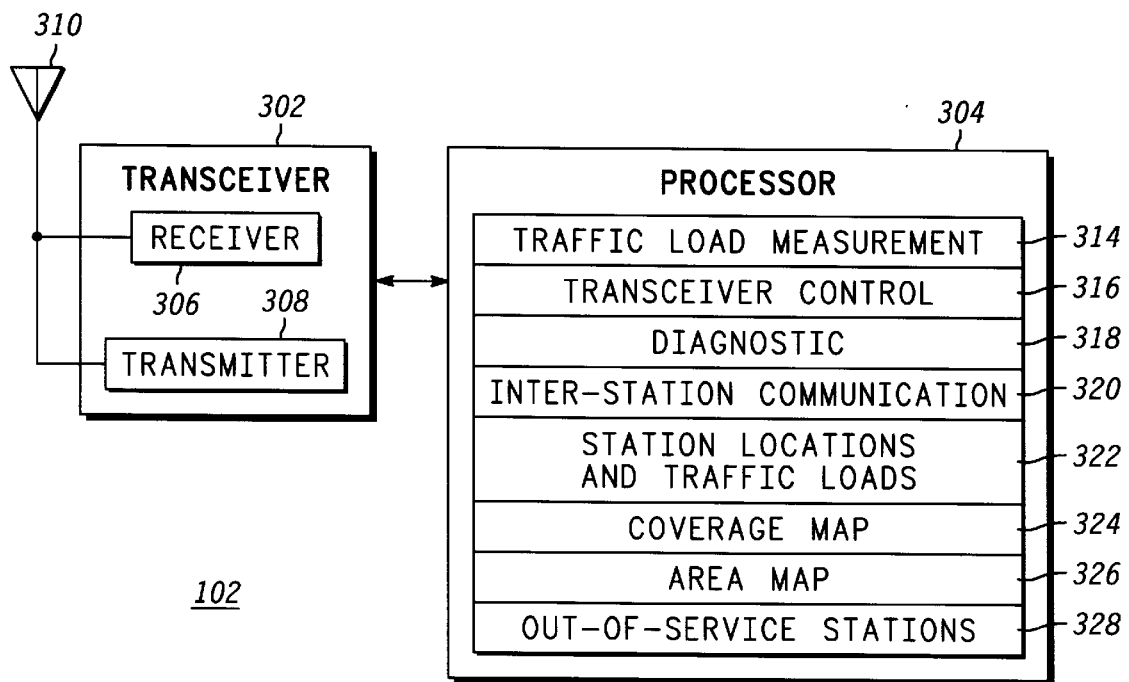
FIG. 3 is an electrical block diagram of a fixed communication station in accordance with the first embodiment.

Referring to FIG. 3, an electrical block diagram of the fixed communication station 102 in accordance with the first embodiment comprises a conventional, preferably multi-channel, transceiver 302 coupled to a conventional processor 304. The transceiver 302 includes a receiver 306 and a transmitter 308, both preferably coupled to an antenna 310. It will be appreciated that, alternatively, separate antennas can be coupled to the receiver 306 and the transmitter 308. The processor 304 includes memory space for a traffic load measurement program 314 for programming the processor 304 to measure the current traffic load of the station 102, e.g., the percentage of channel capacity currently in use, through well-known techniques. The processor 304 further comprises a transceiver control program 316 for programming the processor 304 to control the transceiver 302 to transmit information describing its own location and the locations of nearby others of the plurality of fixed communication stations 102, along with the traffic loads corresponding to the stations 102. The processor 304 also includes a diagnostic program 318 for programming the processor 304 to maintain diagnostic information concerning the operation of the station 102. The diagnostic information preferably can be transmitted to authorized portable communication units 104 upon request for maintaining the wireless communication system.

The processor 304 further comprises an inter-station communication program 320 for programming the processor 304 to control the transceiver 302 to communicate with nearby other ones of the plurality of fixed communication stations 102 for collecting information therefrom, such as traffic load information and service status. In addition, the processor 304 includes memory space for storing various information which can be transmitted to the portable communication unit 104. This information preferably includes text describing the station locations and corresponding traffic loads 322, and a coverage map 324 depicting areas of good communication coverage in the wireless communication system. The information further includes an area map 326 for graphically depicting the area and the station locations and traffic loads. The information also includes a list of out-of-service stations 328, which can be transmitted in response to a maintenance command. It will be appreciated that, alternatively, some or all of the programs and other information depicted as stored in the processor 304 can be removed to a separate memory element (not shown), such as a magnetic or optical storage medium coupled to the processor 304. Operation of the station 102 is described further herein below.

Figure 4:
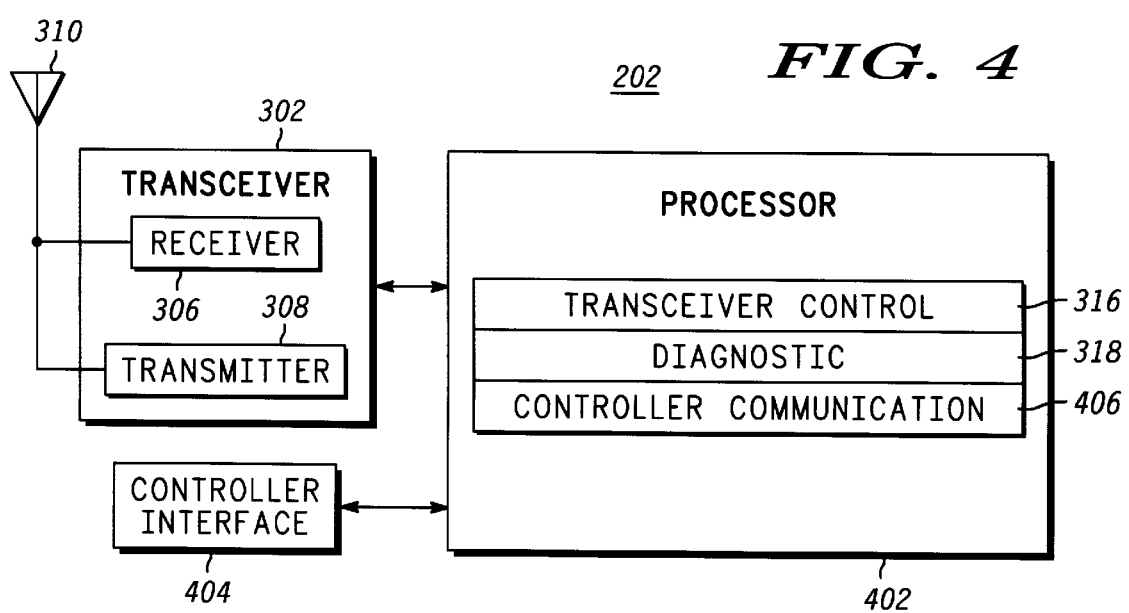
FIG. 4 is an electrical block diagram of a fixed communication station in accordance with the second embodiment.

Referring to FIG. 4, an electrical block diagram of the fixed communication station 202 in accordance with the second embodiment is similar to the station 102, the essential difference being that many of the tasks performed and much of the information stored in the processor 304 of the station 102 have been relegated to the controller 204. The processor 402 retains the transceiver control program 316 and the diagnostic program 318, and has an additional controller communication program 406 for programming the processor 402 to communicate with the controller 204 through a conventional controller interface 404.

Figure 5:
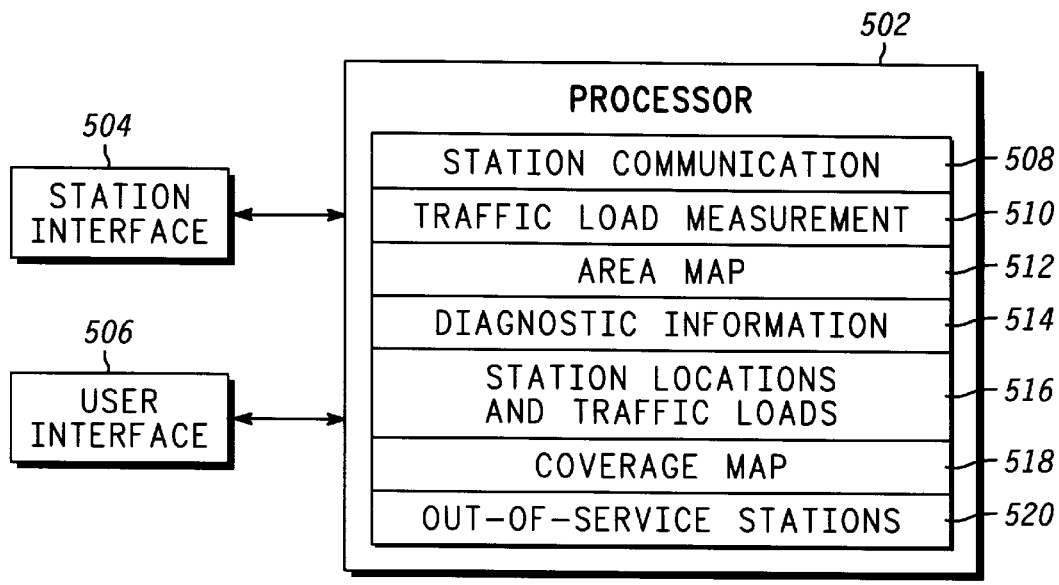
FIG. 5 is an electrical block diagram of a controller in accordance with the second embodiment.

Referring to FIG. 5, an electrical block diagram of the controller 204 in accordance with the second embodiment comprises a conventional station interface 504 coupled to a conventional processor 502 for communicating with the plurality of fixed communication stations 202. The controller 204 preferably also includes a user interface 506, e.g., a conventional keyboard-display terminal, for user supervision and programming of the controller 204. The processor 502 includes a station communication program 508 for communicating with the plurality of fixed communication stations 202 through well-known techniques for gathering and distributing information therefrom and thereto. The processor 502 also preferably includes a traffic load measurement program 510 for programming the processor 502 to keep track of the traffic loads of the plurality of fixed communication stations 202. It will be appreciated that, alternatively, the stations 202 can keep track of their own traffic loads and report the traffic loads to the controller 204 for distribution to appropriate other stations 202. In addition, the processor 502 includes memory space for storing various information both pre-programmed and gathered dynamically from the stations 202. This information is made available to the stations 202 upon request. The information includes at least one area map 512 for graphically depicting the area around one of the stations 202 along with the locations and traffic loads of other nearby stations. The information also includes diagnostic information 514 gathered from the stations 202, as well as text descriptions of the station locations and corresponding traffic loads 516. In addition, the information preferably includes a coverage map 518, and a list of out-of-service stations 520. It will be appreciated that, alternatively, some or all of the programs and other information depicted as stored in the processor 502 can be removed to a separate memory element (not shown), such as a magnetic or optical storage medium coupled to the processor 502.

Figure 6:
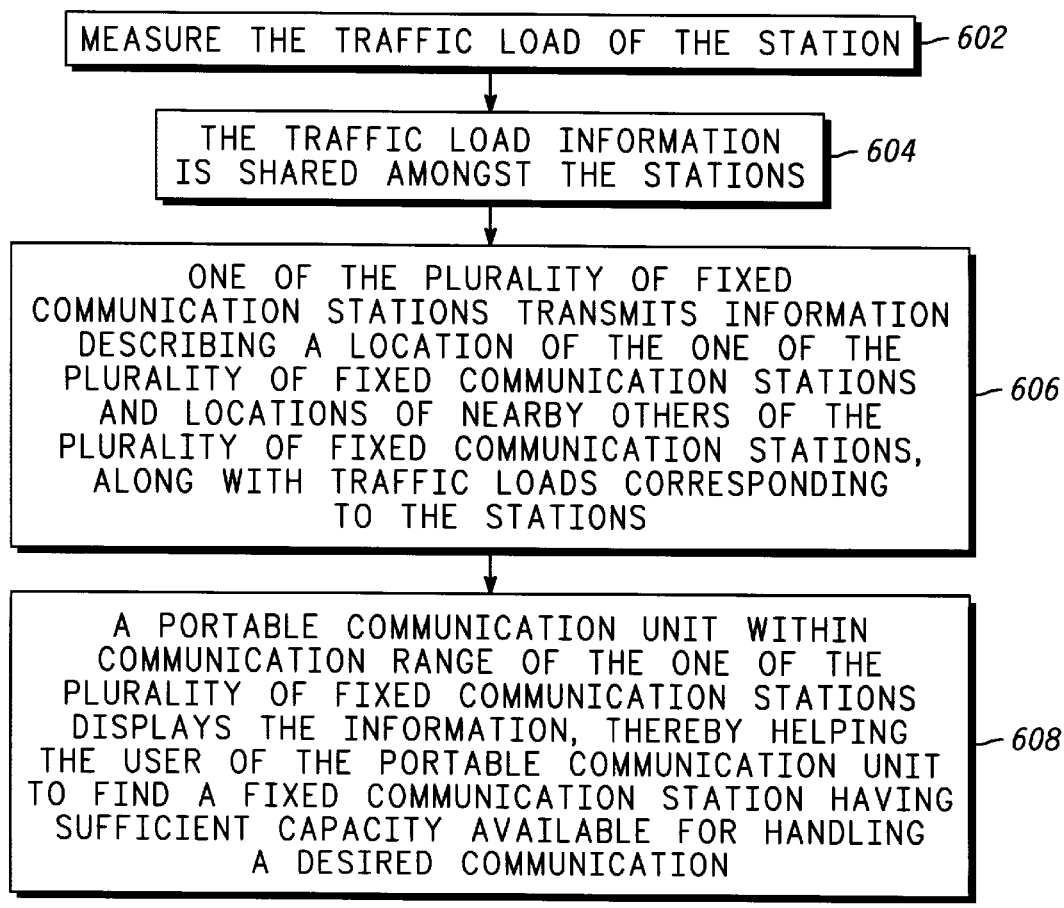
FIG. 6 is a flow diagram depicting operation of the wireless communication system in accordance with the present invention.

Referring to FIG. 6, a flow diagram 600 depicting operation of the wireless communication system in accordance with the present invention begins with measuring 602 the traffic load of each of the plurality of fixed communication stations 102, 202. As stated earlier, in the first embodiment 100 this measurement is made by each of the stations 102. In the second embodiment 200 this measurement preferably is made by the controller 204, but, alternatively, can be made by the stations 202 and communicated to the controller 204. Next, the traffic load information is shared 604 amongst the stations. This is accomplished in the first embodiment 100 by ad-hoc communications between each station 102 and other near-by, i.e., within range, stations 102. In the second embodiment, the controller 204 obtains the traffic load information and then distributes it to the stations 202.

Next, at least one of the plurality of fixed communication stations 102, 202 which is in communication range of the portable communication unit 104 transmits 606 information describing the location of the at least one of the plurality of fixed communication stations 102, 202 and locations of nearby others of the plurality of fixed communication stations 102, 202, along with traffic loads corresponding to the stations 102, 202. The information preferably is transmitted on a map of the area depicting the locations of the stations 102, 202. Alternatively, text can be used to describe the locations of the stations 102, 202. The information is preferably transmitted at the request of the portable communication unit 104. It will be appreciated that, alternatively, the information can be broadcast periodically or only when necessary, e.g., when a station 102, 202 exceeds a predetermined traffic load.

The information is then preferably displayed 608 on a conventional display of the portable communication unit 104, thereby assisting the user of the portable communication unit 104 to find a station 102, 202 having sufficient capacity available for handling a desired communication. For example, if the user wants to download a data file of considerable size, the user can try to find a station 102, 202 whose current traffic load is well below maximum capacity, so that the data file will download with minimum delay. It will be appreciated that in some applications the "user" of the portable communication unit 104 can be a robotic device. In such applications the portable communication unit 104 can convey the information to the robotic device through an electronic interface, thereby assisting the robotic device to find a suitable fixed communication station 102, 202.

Other types of information preferably can be transmitted by the wireless communication system in accordance with the present invention. These other types of information include diagnostic information about the system, stations that are currently out-of-service, and a coverage map depicting areas of good communication coverage.

It should be clear from the preceding disclosure that the present invention provides a method and apparatus that can determine the location of a nearby communication resource that has available capacity and can identify the location to the user, along with an indication of the current traffic load at the location. Advantageously, the indication of the current traffic load allows the user to make an informed decision about whether a trip to the nearby location will likely succeed in enabling a desired communication.

Many modifications and variations of the present invention are possible in light of the above teachings. Thus, it is to be understood that, within the scope of the appended claims, the invention can be practiced other than as specifically described herein above.

What is claimed is:

1. A method for assisting a user to find an available communication resource, the method comprising the steps of:

measuring a traffic load of ones of a plurality of fixed communication stations;

transmitting from at least one of the plurality of fixed communication stations information describing a location of the at least one of the plurality of fixed communication stations and locations of nearby others of the plurality of fixed communication stations, along with traffic loads corresponding to the stations; and displaying the information at a portable communication unit within communication range of the at least one of the plurality of fixed communication stations, thereby assisting the user of the portable communication unit to find a fixed communication station having sufficient capacity available for handling a desired communication.

2. The method of claim 1, wherein the transmitting step includes the step of transmitting a map.

3. The method of claim 1, further comprising the step of transmitting diagnostic information.

4. The method of claim 1, wherein the transmitting step includes the step of transmitting text describing the locations of the stations.

5. The method of claim 1, further comprising the step of transmitting a coverage map depicting areas of good communication coverage.

6. The method of claim 1, further comprising the step of transmitting the locations of stations which are out-of-service.

7. A wireless communication system for assisting a user to find an available communication resource, the wireless communication system comprising:

a plurality of fixed communication stations, each station comprising:
a transceiver; and
a processor coupled to the transceiver for controlling the transceiver, wherein the processor is programmed to:
measure a traffic load of the station;
receive traffic loads corresponding to the fixed stations; control the transceiver to transmit information describing a location of the station and locations of nearby other of the plurality of fixed communication stations, along with traffic loads corresponding to the fixed stations; and a portable communication unit in communication with one of said plurality of fixed communication stations, for displaying the information to the user, thereby assisting the user to find a fixed communication station having sufficient capacity available for handling a desired communication.

8. The wireless communication system of claim 7, wherein the processor is further programmed to control the transceiver to transmit a map.

9. The wireless communication system of claim 7, wherein the processor is further programmed to control the transceiver to transmit diagnostic information.

10. The wireless communication system of claim 7, wherein the processor is further programmed to control the transceiver to transmit text describing the locations of the stations.

11. The wireless communication system of claim 7, wherein the processor is further programmed to control the transceiver to transmit a coverage map depicting areas of good communication coverage.

12. The wireless communication system of claim 7, wherein the processor is further programmed to control the transceiver to transmit the locations of stations which are out-of-service.

13. A fixed communication station, comprising a transceiver; and a processor coupled to the transceiver for controlling the transceiver, wherein the processor is programmed to:
measure a traffic load of the station;
receive traffic loads corresponding to the fixed stations; and
control the transceiver to transmit information describing a location of the station and locations of nearby other stations, along with traffic loads corresponding to the fixed stations, to a portable communication unit within communication range of the transceiver, thereby displaying the information at the portable communication unit to assist a user of the portable communication unit to find a fixed communication station having sufficient capacity available for handling a desired communication.

14. The fixed communication station of claim 13, wherein the processor is further programmed to control the transceiver to transmit a map.

15. The fixed communication station of claim 13, wherein the processor is further programmed to control the transceiver to transmit diagnostic information.

16. The fixed communication station of claim 13, wherein the processor is further programmed to control the transceiver to transmit text describing the locations of the stations.

17. The fixed communication station of claim 13, wherein the processor is further programmed to control the transceiver to transmit a coverage map depicting areas of good communication coverage.

18. The fixed communication station of claim 13, wherein the processor is further programmed to control the transceiver to transmit the locations of stations which are out-of-service.

* * * * *